DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 790

T908,010

PROCESS FOR CURING EPOXY RESIN LAMINATES IN INERT HOT LIQUID MEDIUM

James E. Carey, Twin Lakes Drive, Mantua, N.J. 08051; Robert C. Breitel, 3901 Parkview Lane, Apt. 8B, Irvine, Calif. 92664; and Robert J. Moore, 12315 Longworth Lane, Bunker Hill, Houston, Tex. 77024

Filed Dec. 13, 1971, Ser. No. 207,653

Int. Cl. B05c *3/12;* B44d *1/098, 1/46*

U.S. Cl. 117—119.6

No Drawing. 18 Pages Specification

Glass fiber bundles, glass mat or glass cloth reinforced plastic laminates having improved water resistance and electrical properties are prepared by first impregnating fiber bundles, mats or cloth with a solventless mixture of a liquid polymeric resin such as an epoxy resin and a curing agent therefor and then immersing the product in a hot, non-solvent, liquid bath (silicone oil, molten aliphatic wax) to effect polymerization and cure of the resin.